US012567053B1

(12) United States Patent
Spitzer

(10) Patent No.: US 12,567,053 B1
(45) Date of Patent: *Mar. 3, 2026

(54) INTERACTIVE ELECTRONIC NOTIFICATION

(71) Applicant: Block, Inc., Oakland, CA (US)

(72) Inventor: Garrett Spitzer, San Francisco, CA (US)

(73) Assignee: Block, Inc., Oakland, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 18/584,267

(22) Filed: Feb. 22, 2024

Related U.S. Application Data

(63) Continuation of application No. 16/740,857, filed on Jan. 13, 2020, now Pat. No. 11,948,140, which is a
(Continued)

(51) Int. Cl.
*G06Q 20/24* (2012.01)
*G06Q 20/02* (2012.01)
(Continued)

(52) U.S. Cl.
CPC ........... *G06Q 20/24* (2013.01); *G06Q 20/023* (2013.01); *G06Q 20/202* (2013.01);
(Continued)

(58) Field of Classification Search
CPC .... G06Q 20/24; G06Q 20/023; G06Q 20/202; G06Q 20/204; G06Q 20/3223; G06Q 20/407; G06Q 40/12
See application file for complete search history.

(56) References Cited

U.S. PATENT DOCUMENTS 6,088,681 A 7/2000 Coleman et al.
6,208,976 B1 3/2001 Kinebuchi et al.
(Continued)

FOREIGN PATENT DOCUMENTS

EP 2549725 A1 1/2013
TW 201604822 A 2/2016
(Continued)

OTHER PUBLICATIONS

Song, An investigation on multiple e-payments and micro-payment—a technical and market view, Jan. 1, 2002, Proceedings 16th Parallel and Distributed Processing Symposium, p. 8 (Year: 2002).*

(Continued)

*Primary Examiner* — Aaron N Tutor
(74) *Attorney, Agent, or Firm* — Polsinelli PC

(57) ABSTRACT
In some examples, a system receives an indication of a payment for a transaction between a first user and a second user, and initiated using a physical card or a virtual card associated with an account of the first user. A notification representative of the transaction is presented via a user interface of a user device of the first user and includes transaction details associated with the transaction, and further includes an interactive component to enable the first user to finance an amount for at least a portion of the payment in lieu of using funds from the account of the first user. Based on receiving an indication of an interaction with the interactive component, the second user is paid using funds associated with the amount financed. A series of payments are initiated at least from the account of the first user for repayment of at least the amount financed.

20 Claims, 8 Drawing Sheets

Related U.S. Application Data continuation of application No. 14/993,804, filed on Jan. 12, 2016, now Pat. No. 10,535,054.

(51) Int. Cl.

| | |
|---|---|
| *G06Q 20/20* | (2012.01) |
| *G06Q 20/32* | (2012.01) |
| *G06Q 20/40* | (2012.01) |
| *G06Q 40/12* | (2023.01) |

(52) U.S. Cl.

CPC ....... *G06Q 20/204* (2013.01); *G06Q 20/3223* (2013.01); *G06Q 20/407* (2013.01); *G06Q 40/12* (2013.12)

(56) References Cited

U.S. PATENT DOCUMENTS

| | | | |
|---|---|---|---|
| 7,680,690 | B1 | 3/2010 | Catalano |
| 9,230,292 | B2 | 1/2016 | Amin et al. |
| 9,299,102 | B1 | 3/2016 | Pike et al. |
| 9,727,912 | B1 | 8/2017 | Poursartip et al. |
| 9,754,331 | B1 | 9/2017 | Beckelman et al. |
| 9,858,597 | B2 | 1/2018 | DeWitt et al. |
| 9,858,614 | B2 | 1/2018 | Seaward et al. |
| 9,875,469 | B1 | 1/2018 | Chin et al. |
| 9,978,099 | B2 | 5/2018 | Rephlo et al. |
| 10,043,149 | B1 | 8/2018 | Tacono et al. |
| 10,168,860 | B1 | 1/2019 | Bell et al. |
| 10,169,837 | B2 | 1/2019 | Wilson et al. |
| 10,423,298 | B2 | 9/2019 | Bell et al. |
| 10,535,054 | B1 | 1/2020 | Spitzer et al. |
| 10,546,344 | B2 | 1/2020 | Bell et al. |
| 10,762,482 | B2 | 9/2020 | Bell et al. |
| 11,151,530 | B2 | 10/2021 | Bell et al. |
| 11,948,140 | B1 | 4/2024 | Spitzer |
| 2002/0174014 | A1 | 11/2002 | Wittrup |
| 2002/0188492 | A1 | 12/2002 | Borton |
| 2002/0188495 | A1 | 12/2002 | Banerjee et al. |
| 2004/0210621 | A1 | 10/2004 | Antonellis |
| 2005/0030162 | A1 | 2/2005 | Stambaugh |
| 2005/0283436 | A1* | 12/2005 | Greer .......................... G07F 7/08 705/40 |
| 2006/0235755 | A1 | 10/2006 | Mueller et al. |
| 2006/0241966 | A1 | 10/2006 | Walker et al. |
| 2007/0060358 | A1 | 3/2007 | Amaitis et al. |
| 2007/0106411 | A1 | 5/2007 | Huber-Buschbeck et al. |
| 2008/0077506 | A1* | 3/2008 | Rampell ................ G06Q 20/40 705/26.1 |
| 2008/0312987 | A1 | 12/2008 | Damodaran et al. |
| 2008/0319864 | A1 | 12/2008 | Leet |
| 2009/0048890 | A1 | 2/2009 | Burgh |
| 2009/0171843 | A1 | 7/2009 | Lee et al. |
| 2010/0120538 | A1 | 5/2010 | DeWitt |
| 2010/0125886 | A1 | 5/2010 | Qian et al. |
| 2010/0332265 | A1 | 12/2010 | Smith |
| 2011/0029359 | A1 | 2/2011 | Roeding et al. |
| 2011/0125689 | A1 | 5/2011 | Bernard et al. |
| 2011/0251892 | A1 | 10/2011 | Laracey |
| 2012/0115501 | A1 | 5/2012 | Zheng |
| 2012/0173350 | A1 | 7/2012 | Robson |
| 2012/0191522 | A1 | 7/2012 | Mclaughlin et al. |
| 2012/0191551 | A1 | 7/2012 | Lutnick et al. |
| 2012/0221446 | A1 | 8/2012 | Grigg et al. |
| 2013/0042296 | A1 | 2/2013 | Hastings et al. |
| 2013/0046643 | A1 | 2/2013 | Wall et al. |
| 2013/0054863 | A1 | 2/2013 | Imes et al. |
| 2013/0132274 | A1 | 5/2013 | Henderson et al. |
| 2013/0278631 | A1 | 10/2013 | Border et al. |
| 2013/0317921 | A1 | 11/2013 | Havas |
| 2013/0318458 | A1 | 11/2013 | Lyons et al. |
| 2013/0346302 | A1 | 12/2013 | Purves et al. |
| 2014/0074580 | A1 | 3/2014 | Khuchua-Edelman et al. |
| 2014/0074631 | A1 | 3/2014 | Grossman et al. |
| 2014/0100971 | A1 | 4/2014 | Klearman |
| 2014/0136348 | A1 | 5/2014 | Carroll et al. |
| 2014/0156431 | A1 | 6/2014 | Morgan et al. |
| 2014/0156433 | A1* | 6/2014 | Hills ..................... G06Q 40/03 705/21 |
| 2014/0171039 | A1 | 6/2014 | Bjontegard |
| 2014/0188637 | A1 | 7/2014 | Balasubramaniam et al. |
| 2014/0201655 | A1 | 7/2014 | Mahaffey et al. |
| 2014/0214465 | A1 | 7/2014 | L'Heureux et al. |
| 2014/0214534 | A1 | 7/2014 | L'Heureux et al. |
| 2014/0257926 | A1 | 9/2014 | Rasband |
| 2014/0351068 | A1 | 11/2014 | Renfroe |
| 2015/0025983 | A1 | 1/2015 | Cicerchi |
| 2015/0046297 | A1 | 2/2015 | Bahrami et al. |
| 2015/0072663 | A1 | 3/2015 | Chande et al. |
| 2015/0073925 | A1 | 3/2015 | Renfroe |
| 2015/0127496 | A1 | 5/2015 | Marathe et al. |
| 2015/0134439 | A1 | 5/2015 | Maxwell et al. |
| 2015/0169034 | A1 | 6/2015 | Huang et al. |
| 2015/0186885 | A1 | 7/2015 | Agrawal et al. |
| 2015/0187027 | A1 | 7/2015 | Lowe |
| 2015/0213547 | A1 | 7/2015 | Gomez-Rosado et al. |
| 2015/0262121 | A1 | 9/2015 | Riel-Dalpe et al. |
| 2015/0262208 | A1 | 9/2015 | Bjontegard |
| 2015/0324901 | A1 | 11/2015 | Starikova et al. |
| 2016/0012465 | A1 | 1/2016 | Sharp |
| 2016/0019614 | A1 | 1/2016 | Dziuk |
| 2016/0026958 | A1 | 1/2016 | Lee |
| 2016/0029160 | A1 | 1/2016 | Theurer et al. |
| 2016/0078264 | A1 | 3/2016 | Armstrong et al. |
| 2016/0092874 | A1 | 3/2016 | O'Regan et al. |
| 2016/0171584 | A1 | 6/2016 | Cao |
| 2016/0180033 | A1 | 6/2016 | Rosenberg |
| 2016/0202851 | A1 | 7/2016 | Turner et al. |
| 2016/0203506 | A1 | 7/2016 | Butler et al. |
| 2016/0308798 | A1 | 10/2016 | Magistrado et al. |
| 2016/0314522 | A1* | 10/2016 | Kabello .............. G06Q 20/023 |
| 2017/0006429 | A1 | 1/2017 | Douglas et al. |
| 2017/0055752 | A1 | 3/2017 | Mueller et al. |
| 2017/0109843 | A1 | 4/2017 | Berg et al. |
| 2017/0124670 | A1 | 5/2017 | Becker et al. |
| 2017/0243195 | A1 | 8/2017 | Xing |
| 2017/0255898 | A1 | 9/2017 | Thomas |
| 2017/0278202 | A1 | 9/2017 | Mimassi |
| 2017/0278204 | A1 | 9/2017 | Mimassi |
| 2017/0287086 | A1 | 10/2017 | Lopez et al. |
| 2017/0293950 | A1 | 10/2017 | Rathod |
| 2017/0314981 | A1 | 11/2017 | Flockenhaus et al. |
| 2017/0352017 | A1 | 12/2017 | Hay |
| 2018/0181941 | A1 | 6/2018 | Maxwell et al. |
| 2018/0268324 | A1 | 9/2018 | Zhang et al. |
| 2018/0268328 | A1 | 9/2018 | Baggott et al. |
| 2018/0300741 | A1 | 10/2018 | Leonard et al. |
| 2019/0003503 | A1 | 1/2019 | Lackore et al. |
| 2019/0213657 | A1 | 7/2019 | Malik |
| 2022/0051206 | A1 | 2/2022 | Bell et al. |

FOREIGN PATENT DOCUMENTS

| | | | |
|---|---|---|---|
| WO | 2006/115984 | A1 | 11/2006 |
| WO | 2008/087003 | A1 | 7/2008 |
| WO | 2011/124928 | A1 | 10/2011 |
| WO | 2017/180518 | A1 | 10/2017 |
| WO | 2018/063474 | A1 | 4/2018 |

OTHER PUBLICATIONS

"Handheld ordering systems—The caterer", www.thecaterer.com/news, Apr. 26, 2005, 7 pages.

"Handheld restaurant POS: Efficient service is fast and responsive. What could be faster and more responsive than servicing your guests right at their tables?", Clock POS—Handheld POS for modern guest service, 2014, 9 pages.

"PayPal Here: Credit Card Reader | Point of Sale and Mobile Credit Card Processing", PayPal.com, accessed at https://web.archive.org/web/20141202030140/https://www.paypal.com/us/webapps/mpp/credit-card-reader, Accessed on Dec. 2, 2014, pp. 6.

(56) References Cited

OTHER PUBLICATIONS

Bhargave et al., "Digital Ordering System for Restaurant Using Android", International Journal of Scientific and Research Publications, vol. 3, Issue 4, Apr. 2013, 7 pages.

Geoff, "Benefits of Wireless Handheld Order Taking Systems for Restaurants", Access POS, Year 2012, 5 pages.

Kanyan et al., "Improving the Service Operations of Fast-food Restaurants", Procedia Social and Behavioral Sciences, www.sciencedirect.com Aug. 11-15, 2015, 9 pages.

Lorri M., "How Do Successful Restaurants Operate?", www.thebalancesmb.com/restaurant-cooking-positions-2888534 2018, Year 2018, 10 pages.

Mccormack et al., "2D LIDAR as a Distributed Interaction Tool for Virtual and Augmented Reality Video Games", IEEE Games Entertainment Media Conference, Oct. 2015, pp. 1-5.

Song et al., "An investigation on multiple e-payments and micro-payment—a technical and market view", Jan. 1, 2002, Proceedings 16th Parallel and Distributed Processing Symposium, 8 pages.

Statler S., "Our digital and physical worlds collide—beacons," Air Transport IT Review, Sita, pp. 1-6.

Woyke E., "How Stores Will Use Augmented Reality to Make You Buy More Stuff", MIT Technology Review, Jun. 17, 2016, pp. 1-4.

* cited by examiner

300

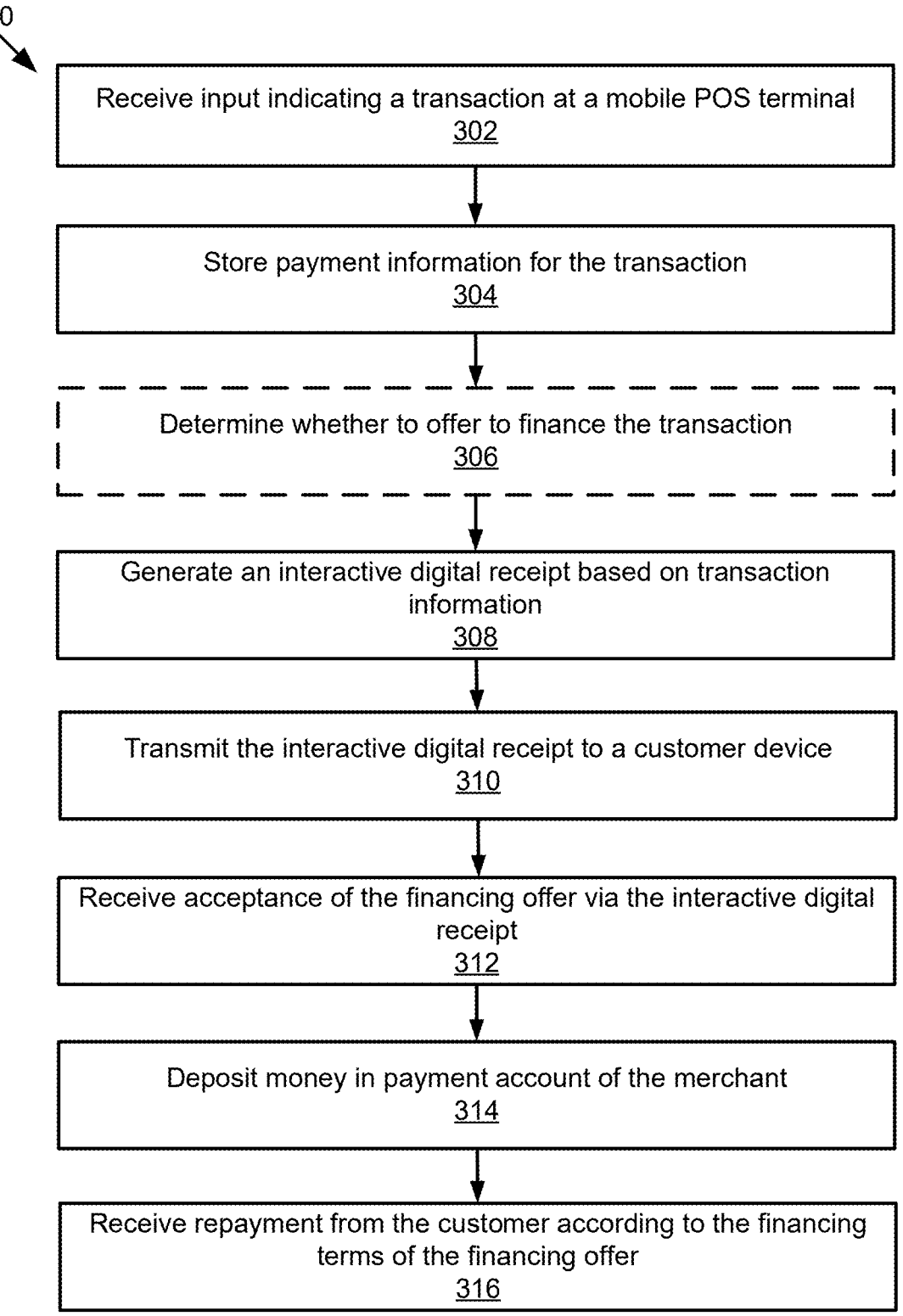

Receive input indicating a transaction at a mobile POS terminal
302

Store payment information for the transaction
304

Determine whether to offer to finance the transaction
306

Generate an interactive digital receipt based on transaction
information
308

Transmit the interactive digital receipt to a customer device
310

Receive acceptance of the financing offer via the interactive digital
receipt
312

Deposit money in payment account of the merchant
314

Receive repayment from the customer according to the financing
terms of the financing offer
316

Figure 3

400
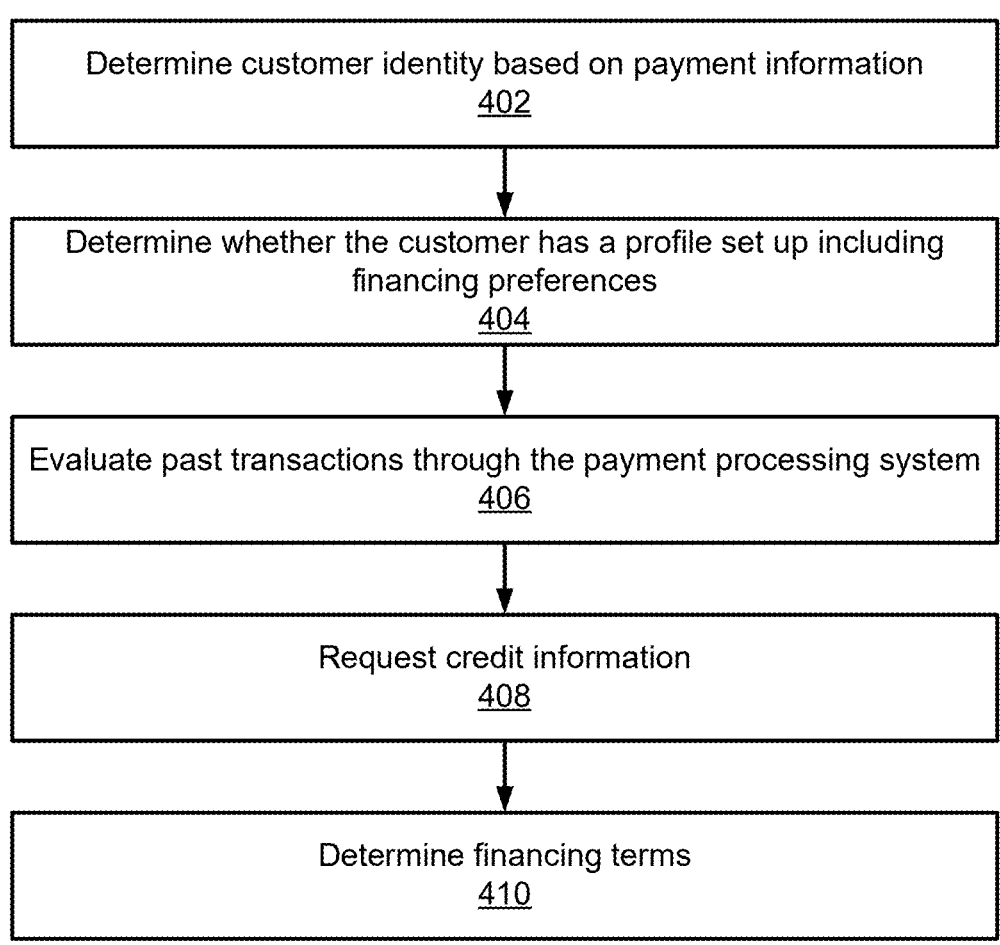
Determine customer identity based on payment information
402
Determine whether the customer has a profile set up including financing preferences
404
Evaluate past transactions through the payment processing system
406
Request credit information
408
Determine financing terms
410
Figure 4

600

Payment Processing System
208

Processor(s)
602

Memory
604

Financing Module
524

Operating System
614

Payment Processing Module
526

Other Modules and Data
616

Interactive Receipt Module
528

Communication Interface(s)
618

Input/Output Device(s)
620

Merchant Account Information
520

Customer Profile Information
522

700

| Merchant Device |
| 204 |

| Processor(s) |
| 702 |

Memory
704

Merchant Application
538

| Transaction Module | Dashboard Module |
| 710 | 712 |

Security Module
726

Operating System
714

| Item Information | Other Modules and Data |
| 716 | 718 |

Display
720

Payment Card Reader
202

| Communication Interface(s) | Input/Output Device(s) |
| 706 | 708 |

INTERACTIVE ELECTRONIC NOTIFICATION

CROSS-REFERENCES TO RELATED APPLICATIONS

This application is a continuation of, and claims priority to, U.S. patent application Ser. No. 16/740,857, filed on Jan. 13, 2020, which is a continuation of, and claims priority to, U.S. patent application Ser. No. 14/993,804, filed on Jan. 12, 2016, issued as U.S. Pat. No. 10,535,054, and all of which are incorporated by reference herein.

BACKGROUND

Mobile payment systems allow individuals and merchants to accept debit and credit cards on their smartphone, tablet, or other mobile computing device. Some mobile payment systems include a payment card reader that reads and transmits payment card information to a connected mobile computing device. The mobile computing device then transmits the payment card information and other transaction information to a payment processing system to be processed. Typically, this information is transmitted over an internet connection or stored for later batch transmission if an internet connection is not available.

Due to the increasing popularity and acceptance of the computer and mobile devices, more and more financial transactions between merchants and customers are being conducted electronically. Many merchants have started to provide their customers with receipts electronically to maintain record of the financial transactions. For example, some merchants may provide a receipt through delivery of an e-mail. In another example, some merchants may make the receipt available through an online customer account on a merchant website. Various solutions are currently available to provide such a receipt electronically, such as building an internal solution specific to a merchant's point of sale (POS) system or integrating with a third party solution into the merchant's POS.

An operator of a mobile payment system may desire to offer financing to customers for POS transactions without arranging financing in advance. Therefore, an efficient way to communicate the financing offer and accomplish financing is needed.

BRIEF DESCRIPTION OF THE DRAWINGS

The techniques described herein are illustrated by way of example, and not by way of limitation, in the figures of the accompanying drawings, in which like reference numerals are used to refer to similar elements.

FIG. 3 is a block diagram of an example process for enabling POS transaction financing via an interactive digital receipt.

FIG. 4 is a block diagram of an example process for determining whether to offer to finance the transaction.

Figure 1A:
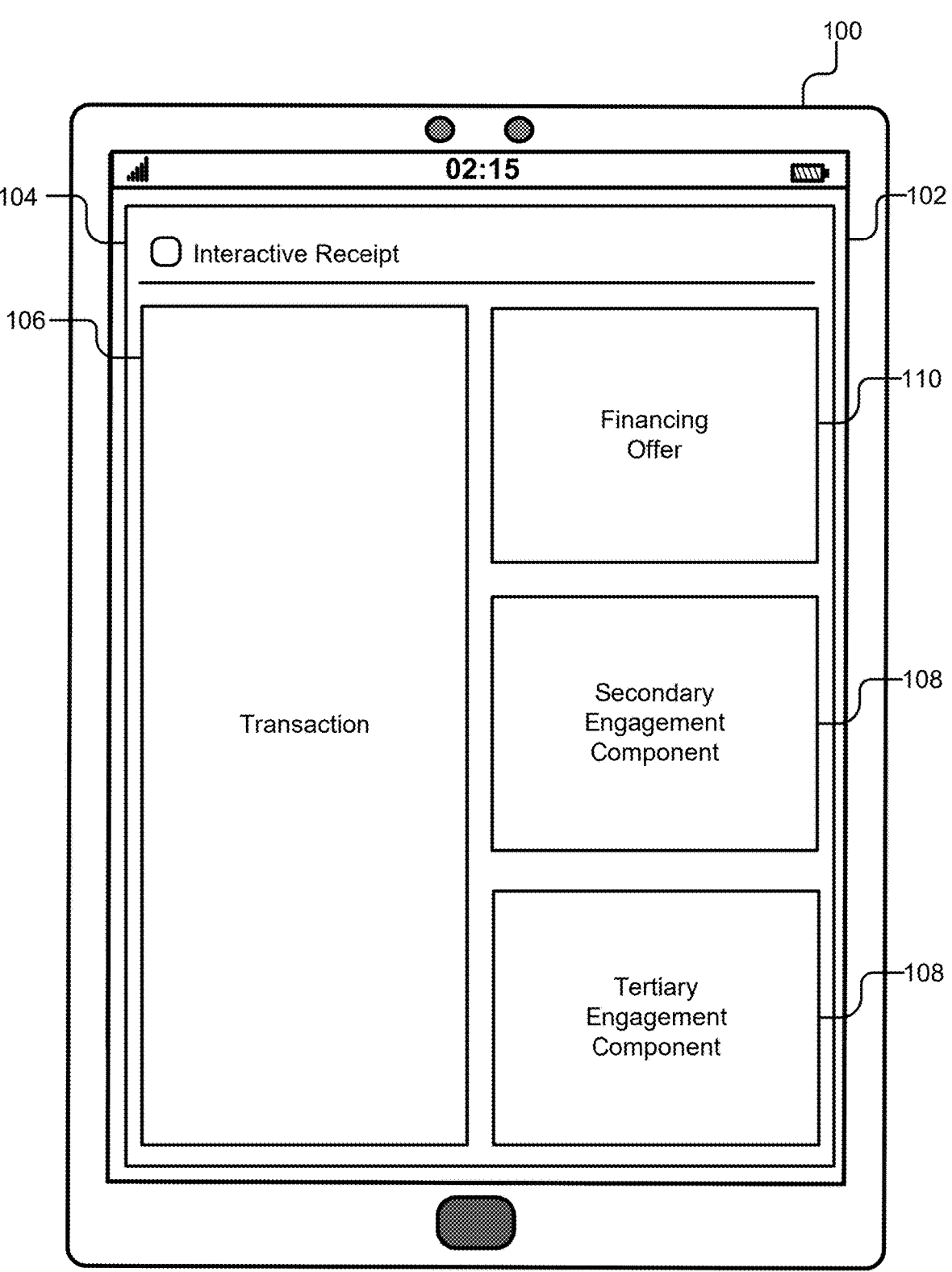
FIGS. 1A-1B illustrate implementations of an interactive digital receipt technique implemented on a user device.

The figures depict various implementations of the techniques described herein for purposes of illustration only. It should be readily recognized from the following discussion that alternative implementations of the structures and methods illustrated herein may be employed without departing from the principles of the techniques described herein.

DETAILED DESCRIPTION

Various implementations of the techniques introduced herein are discussed in detail below. While specific implementations are discussed, it should be understood that this is done for illustration purposes only. It will be recognized that other components and configurations may be used without departing from the spirit and scope of the techniques introduced herein.

Systems and methods in accordance with various implementations of the techniques described in the present disclosure overcome one or more of the above-referenced and other deficiencies in conventional approaches to providing financing, e.g., cash advances, loans, or the like, to customers in a point of sale ("POS") transaction. In particular, the techniques provide an interactive digital receipt on a user device, where the receipt offers an interactive platform for merchants, customers, and a payment processing system to interact. The interactive digital receipt is generated in response to an occurrence of a particular financial transaction between a merchant and a customer, such as a payment transaction conducted at a completion of service and/or goods provided by the merchant. The financial transaction may be a card present point-of-sale (POS) transaction where the customer makes the purchase in the presence of a merchant.

Once the transaction takes place, the interactive digital receipt is generated to provide the customer with an electronic record of the transaction. In addition to providing the transaction record, the interactive digital receipt provides one or more time-based engagements, or interactive components, to enable the merchant, customer, and/or payment processing system to engage, or interact, with one another. The time-based engagements include one or more features that may be available (i.e., offered via the interactive receipt) to the user for a limited, defined time period, allowing the engagements, or the interactions, to take place only until the expiration of the time period.

In some instances, the techniques disclosed herein provide an offer in the interactive digital receipt to finance the transaction for the customer. The techniques may include processing payments, determining financing eligibility, generating an interactive digital receipt through which the financing can be offered and an acceptance received, and executing financing and repayment.

For example, a customer walks into a store of a merchant where he wishes to purchase a painting for $2000 with his credit card. The customer swipes his credit card in the payment card reader of the merchant and the transaction information is sent to a payment processing system to be processed. The merchant's merchant device may request that the customer enter his e-mail address in order to receive a digital receipt. The customer then receives an e-mail including an interactive digital receipt reflecting the transaction in which he purchased the painting. The interactive digital receipt includes information about the transaction as well as an element relating to a personalized financing offer, which the customer interacts with to accept the financing offer. Once the customer has accepted the financing offer, the funds from the financing are transferred to the customer and repayment is collected according to the offer.

In some instances, the financing offer can be made to the customer before funds are disbursed to the merchant or even before the customer's payment card is charged by delivering the receipt before the payment card is charged. Therefore, the interactive digital receipt and payment communication system and techniques described herein allow responses to financing offers for a specific transaction through an interactive digital receipt, increase the amount of customers that accept financing offers, decrease transaction costs, and streamline the financing process. For example, payment network utilization is reduced if the customer accepts the financing offer before the payment card is authorized using a card payment network or bank payment system. The eliminated or delayed card interaction reduces the amount of information that must be transferred and processed by third parties, thereby reducing latency and improving speed and performance of the payment processing system.

FIG. 1A illustrates an implementation of an interactive digital receipt technique implemented on a user device 100. As used herein, the term "user device" refers to any general-purpose computing device capable of data processing, e.g., a merchant device or a customer device. In one example, the user device can be a mobile device, such as a smartphone, a personal digital assistant, a tablet, an e-reader, wearable device, or other mobile or portable computing devices. In another example, the user device can be a personal computing device, such as a desktop, a laptop, or other wired and wireless personal computers. The user device 100 is equipped with a display screen 102 for displaying various user interfaces to enable a user to interact with content generated by the user device 100.

The user device 100 can implement an application, such as an interactive receipt application for use by a mobile user, where the interactive receipt application includes one or more customer interface components. Additionally or alternatively, the user device 100 can receive and interact with an interactive digital receipt via an e-mail program or a web browser, which may be capable of running specialized code including an application having one or more customer interface components. As used herein, a "customer interface component" is a component of a user interface intended for a customer to view and interact with an interactive digital receipt 104. The interactive digital receipt 104 is generated for the customer after an occurrence of a financial transaction between the customer and a merchant (e.g., payment that occurs at the completion of a service and/or tendering of goods), where the interactive digital receipt 104 is displayed on the display screen 102 of the user device 100. It is noted that the interactive digital receipt 104 may take up an entirety or any portion of the display screen 102.

The interactive digital receipt 104 may include a financing feature 110 that enables a financing offer to be sent to the customer and a response to be received and processed by the payment processing system.

Referring to FIG. 1A, the interactive digital receipt 104 includes various interactive components, such as a customer transaction interface component 106 and one or more customer engagement interface components 108. The transaction component 106 displays details associated with a particular transaction between the customer and the merchant, where the transaction details are displayed in real time in response to an occurrence of the particular transaction (e.g., payment transaction at the completion of a service). For example, when the customer has made a payment to the merchant, the interactive digital receipt is transmitted to the user device 100, and included on the receipt are details of the purchased items and prices generated on the transaction component 106.

The one or more engagement components 108 display in real time one or more features for the merchant, the customer, and the payment processing system to interact or engage with one another. The features generated may be configured to be available via the interactive digital receipt only within a defined time period. The defined time period is configurable by the payment processing system as described in reference to FIG. 2.

Figure 1B:
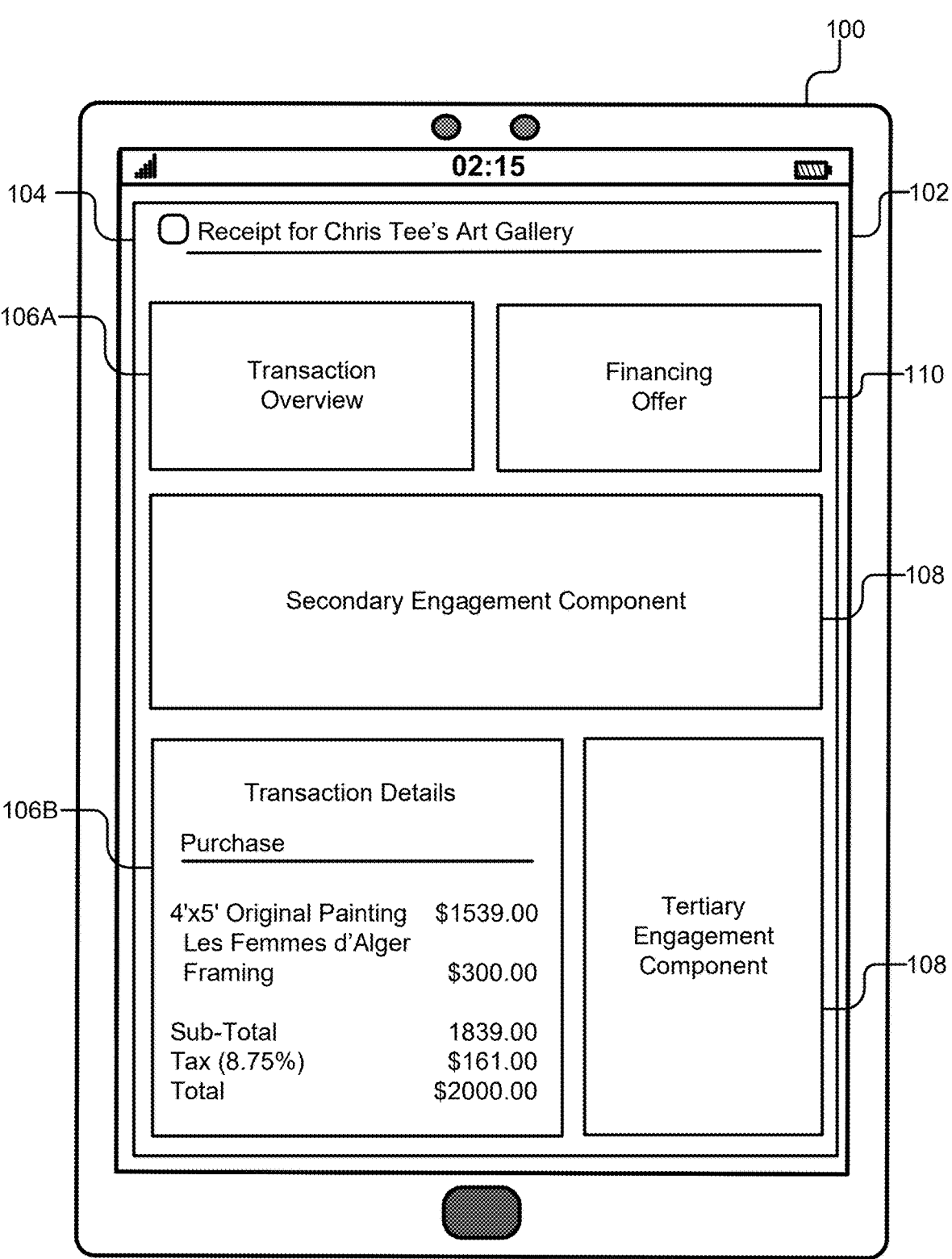

FIG. 1B illustrates another implementation of an interactive digital receipt technique on a user device 100. As illustrated in FIG. 1B, the interactive digital receipt 104 includes an interactive engagement component for generating a financing feature 110. The financing feature 110 allows the customer the option to finance the particular POS transaction, which the interactive digital receipt represents after the occurrence of the particular transaction with a merchant (e.g., tendering or completion of a payment for goods and/or service). The particular transaction may be, for example, payment for a painting at an art gallery visit, where the customer is able to finance the transaction after he/she has left the art gallery. For example, after the customer has tendered his credit card to the merchant to pay for a product, the interactive digital receipt is generated and sent to the customer's user device (e.g., the customer device) for display to the customer. Using the mobile device, the customer can then proceed to interact with the interactive digital receipt to respond to the financing offer, although in some implementations, the interactive digital receipt may direct the customer to another graphical user interface (e.g., on an interactive receipt application or webpage) for further input or interaction. The customer's response to the financing offer may be sent directly to the payment processing system, which may cause the financing to be transmitted and repayment to be collected according to the terms of the financing offer (e.g., financing terms).

The financing feature 110 may be embodied in the interactive digital receipt in a variety of ways. In one example, the interactive digital receipt is a text message. In such an example, upon receiving the receipt via text, a user can indicate acceptance of the financing offer by replying to the text message. In another example, the interactive digital receipt is displayed as part of a user interface associated with a mobile application. In such an example, the financing feature 110 is a text box within the interactive receipt (e.g., interactive receipt 104). The financing feature 110 embodied within the mobile application may also be a user interface component with default financing terms displayed to the user. The default financing terms can be configured to adjust based on the payment amount associated with the transaction, attributes of the customer, attributes of the merchant, or administrative settings. The customer can quickly accept the financing offer including the default terms, or in some implementations, the user can adjust the terms of the financing or repayment. In yet another example, the interactive digital receipt is a Uniform Resource Locator (URL) link, which takes the user to a web page to allow response to the financing offer. The link can be a part of the text message, a part of the text box, a graphical interface component in an interactive receipt application, or an e-mail.

The financing feature 110 may be configurable to be available only for a limited, defined time period after a customer has authorized that the customer's payment card be charged. At the expiration of the defined time period, the financing feature becomes unavailable to the customer.

Referring to FIG. 1B, the interactive digital receipt 104 can include two transaction components 106A, 106B, in addition to the financing feature 110. The transaction component 106A includes an overview of the transaction completed between the customer and the merchant, such as the total amount of the transaction, the payment card used for the transaction (e.g., last four digits of a credit card), the date, or the like. The transaction component 106B includes the details of the transaction, such as the name of the items purchased, the quantity, the price, or the like.

Figure 2:
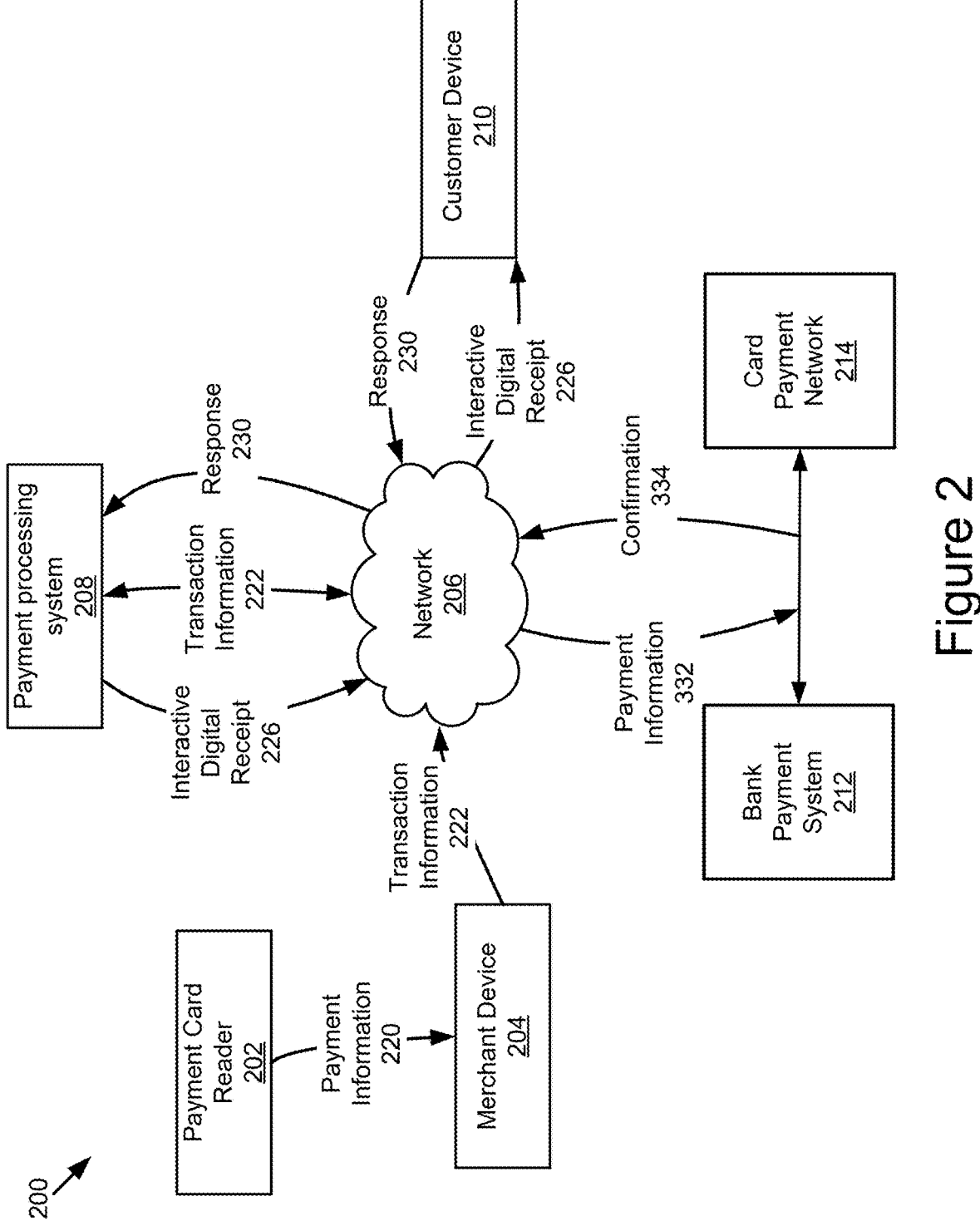
FIG. 2 is a data flow diagram depicting an example data flow among a reader device, a merchant device, a payment processing system, and a customer device.

FIG. 2 is a data flow diagram depicting an example data flow 200 among a payment card reader 202, a merchant device 204, a payment processing system 208, and a customer device 210 according to one implementation. The payment card reader 202 and the merchant device 204 form a POS terminal. The merchant device 204 may be a mobile computing device, as described elsewhere herein, and the payment card reader 202 may include a device that is separate from or integrated into the merchant device 204 and is capable of receiving input including payment card information. For example, the payment card reader 202 may receive a payment card swipe (or other payment card interaction). Alternatively, payment information may be received from any recognition of the customer sufficient to identify the customer and the customer's intent to authorize payment to the payment processing system.

In the example of FIG. 2, the merchant device 204 communicates with the payment card reader 202, to receive payment information 220 for a POS transaction. The payment information 220 may include any information capable of identifying the customer to the payment processing system 208. The reader may receive the payment information 220 from a customer's payment card, which may include a magnetic strip swiped in a magnetic strip reader of the payment card reader 202, an integrated circuit enabled payment card read by an integrated circuit card reader of the payment card reader 202, a near field communication (NFC) enabled physical or digital payment card (e.g., Apple Pay™, Google Wallet™, etc.) interacting with a radio of the payment card reader 202, etc. In some instances, the payment information 220 may be communicated directly between a physical payment card or digital payment card on a customer device and the merchant device 204.

The merchant device 204 transmits transaction information 222 via the network 206 to the payment processing system 208, which receives and stores the transaction information 222. The transaction information may include information regarding the time, place, and the amount of each respective transaction, information related to the item or service acquired, payment information, as well as additional information, such as customer information. Transaction information is described in greater detail in reference to FIG. 5.

The payment processing system 208 may identify the customer based on the transaction information, e.g., based on a credit card number associated with the payment card. The payment processing system 208 determines whether the customer has a customer profile. In some instances, a customer profile is automatically created when a customer uses a payment card for the first time, at which point the payment processing system 208, via the merchant device 204 at the POS transaction, may augment the profile by requesting additional information from the customer, such as an e-mail address, telephone number, account number, etc. In instances where the customer has previously provided contact information, the payment processing system 208 may automatically use that contact information (e.g., a preferred or default e-mail address or phone number) to send the interactive digital receipt to the customer.

Figure 5:
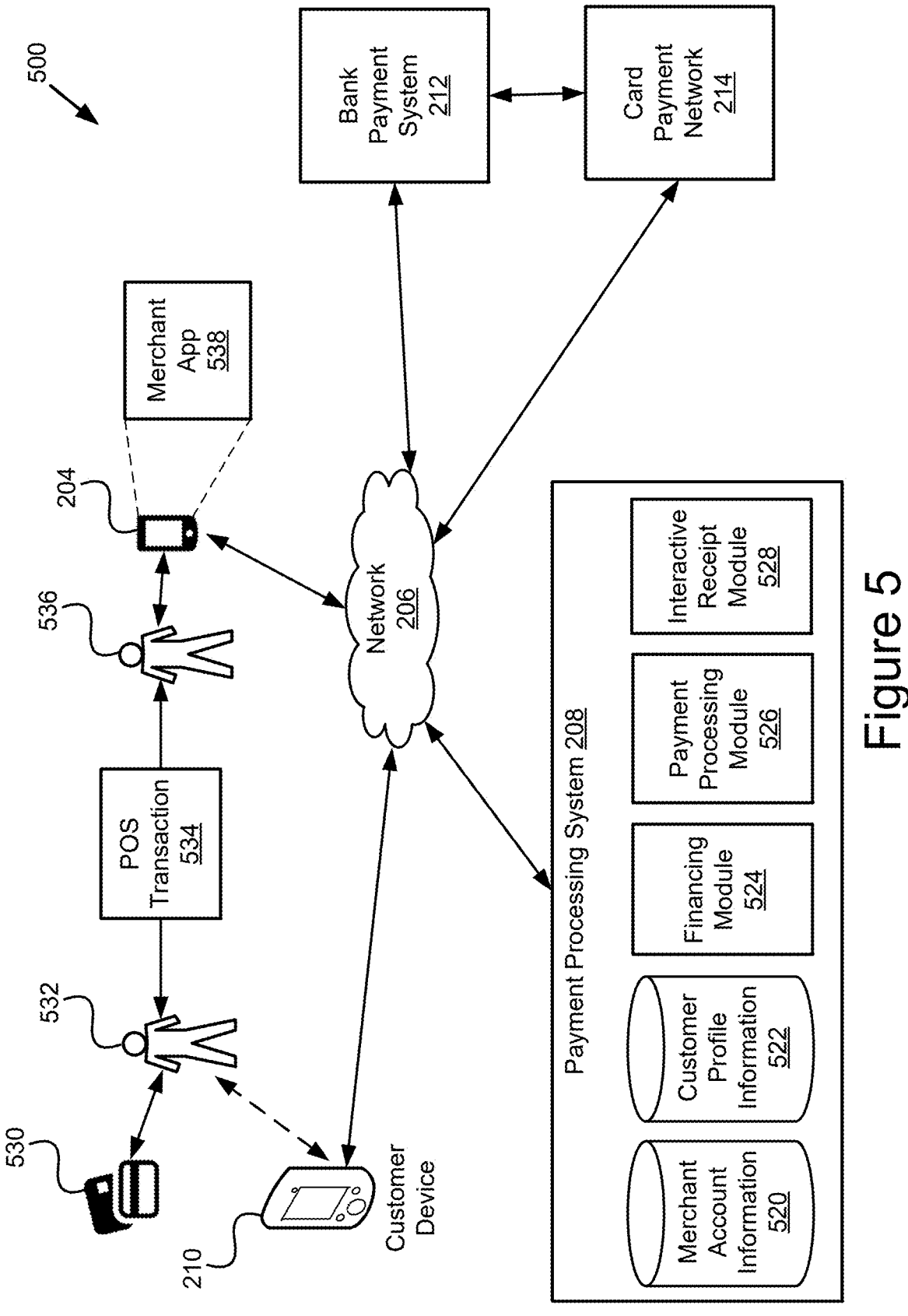
FIG. 5 illustrates an example architecture of a payment communication system for enabling transactions between merchants and customers.

Information may be accumulated in the customer profile (e.g., as stored in the customer profile information 522 shown in FIG. 5) for the customer using the transactions entered into by the customer, profile information added to the customer profile by the customer, or otherwise publicly available. In some instances, the payment processing system 208 may store information about the transactions entered into by the customer in the customer profile, such as the transaction amounts, merchants, merchant attributes, products, locations, cards used, a financing profile, etc. A financing profile may include financing preferences received from the customer, for example, a customer may indicate that he would not like to receive financing offers, prefers financing over periods less than 12 months, or prefers to finance all transactions where he used a certain payment card or with amounts over a threshold, such as $100. In some implementations, the financing profile may include preferences learned based on past financing offers to the customer. For example, the financing module 524 (as shown in FIG. 5) of the payment processing system 208 may track the customer's responses to financing offers to determine when to offer financing. Additionally, the financing profile may include information such as whether the customer is pre-approved to receive financing offers, how much financing the customer is approved to receive, etc.

After receiving the transaction information 222, the payment processing system 208 may process the payment for the transaction by charging the payment card, verify the availability of funds on the payment card by placing an authorization hold on the payment card, or wait to process the payment card until after receiving a response to the financing offer. For example, the payment processing system 208 may process the transaction by communicating with the bank processing system 212 or card payment network 214, as described in further detail with reference to FIG. 5. In instances where the payment processing system 208 determines to offer financing to the customer for the transaction, the payment processing system 208 may, at least temporarily, forgo transmitting payment information 232 to the bank processing system 212 and/or card payment network 214 and waiting for a response 234. Delaying and/or eliminating transmission of the payment information beneficially reduces the amount of information transferred over the network 206 and the latency of the system 200.

In some implementations, the payment processing system 208 may determine whether the customer and/or transaction are eligible for financing (e.g., as described in reference to FIG. 4) and the criteria for acceptance of the financing offer. The criteria may include a time period during which the financing offer may be accepted by the customer. The time period may include a certain length of time after the transaction, after the interactive digital receipt is received by the customer, or may expire on a certain date and time, which may be determined based on an administrative setting or attributes of the merchant, transaction, and/or customer. In some instances, a merchant may be scheduled to receive transaction funds immediately after the transaction, a certain time period after a daily close of business, 24 hours after the transaction, and so forth, which may affect the time period for acceptance. For example, the financing module 524 (as shown in FIG. 5) may determine that the merchant is scheduled to close business for the day at 5:00 pm and receive the transaction funds 24 hours later (e.g., as set based on merchant preferences and stored in merchant account information 520, as shown in FIG. 5), so the financing module sets the time period for acceptance to be the following business day before 5:00 pm. By setting the time period for acceptance to be before funds are to be disbursed to the merchant, the payment processing system 208 does not have to advance funds to the merchant while waiting for the response from the customer, although, in some instances, the payment processing system may advance funds to the merchant before they are collected from the buyer. In some implementations, the time period may be determined using an algorithm that takes into account the likelihood of acceptance (based on previous actions of the customer, similar customers, or similar transactions), the cost of transferring funds at certain speeds (e.g., automatic clearing house "ACH" is less expensive than via debit rails), when a merchant is scheduled to receive funds, and/or other criteria.

In some implementations, the financing module 524 may determine financing terms for the financing offer, which may be based on the merchant, customer, transaction, administrative settings, or selectable by the customer. For example, the financing terms may include an approved financing amount, repayment terms, repayment amount, a repayment duration, an interest rate, a processing fee, and various other terms relating to repayment, etc. For example, an approved financing amount may be all or a portion of a transaction amount. In another example, the financing terms may include a fee for the financing, such as a set percentage of the approved financing amount, an interest rate, or a flat fee. Repayment terms may include the length of repayment, payment amounts, payment methods, etc. In some instances, the repayment terms may include that the repayment is to be collected in a series of smaller transactions by the payment processing module 526 (as shown in FIG. 5) of the payment processing system 208. For example, the payment processing module 526 processes the same payment card used in the POS transaction or collects repayment via ACH from a checking account set by the customer (e.g., during acceptance of the financing offer). The payment processing system 208 may store the payment card information so that repayment may be collected from the same payment card used in the transaction. In some instances, repayment is received by transmitting payment operation requests (e.g., a number of smaller payment requests) to a bank payment system.

Returning to FIG. 2, the payment processing system 208 generates an interactive digital receipt and transmits the interactive digital receipt 226 via the network 206 to the customer device 210 for display to the customer. For instance, the interactive receipt module 528 (as shown in FIG. 5) receives the transaction information 222 and the financing offer and generates an interactive digital receipt (e.g., as in FIGS. 1A and 1B). The payment processing system 208 may send the interactive digital receipt 226 to the customer device 210 for display in an e-mail program, text message, interactive receipt application, or other means capable of displaying and interacting with the interactive digital receipt.

The customer device 210 may display the interactive digital receipt to the customer and may then transmit the customer's response received via the interactive digital receipt to the payment processing system 208. In some implementations, if the customer does not respond to the financing offer within the time period for acceptance, the option to accept on the interactive digital receipt may expire. For example, the customer may no longer be able to view or select the option to accept the financing offer on the interactive digital receipt. Alternatively, if the customer accepts the financing offer, a confirmation message or interface may be displayed confirming financing, financing terms, repayment terms, or requesting additional information from the customer, such as contact information, credit information, payment information, requested modification of the financing terms, and so forth.

The payment processing system 208 receives the response 230 from the customer device 210 via the network 206 and settles the transaction. In particular, in response to a rejection or expiration of the time period for acceptance, the payment processing system 208 charges the payment card and distributes the funds to the merchant. Alternatively, if the response 230 includes an acceptance, the payment processing system 208 may issue the financing funds to the merchant and initiate repayment of the financing from the customer according to the repayment terms.

In some implementations, if the response 230 includes an acceptance, the financing module 524 determines whether the acceptance satisfies criteria, such as the time period for acceptance. The financing module 524 may also determine any modifications requested by the customer to the financing terms and set the financing terms, such as the repayment terms based on the requested modifications.

In some implementations, the payment processing system 208 determines the type of payment card used based on the transaction information 222. Further, the payment processing system determines when and how to process the payment card based on the type of payment card in conjunction with administrative settings. For example, the payment processing system 208 may charge the customer's payment card for the transaction payment, receive an acceptance of the financing offer, and then refund the financing amount to the customer. In another example, the payment processing system 208 may wait to charge the payment card until after a response to the financing offer is received in order to avoid charging and then refunding the payment card.

In some implementations, the payment processing system 208 may wait to process the payment associated with the transaction for a given period of time (e.g., the time period for acceptance) or until acceptance is received, which reduces latency and defers network utilization. For example, deferring network utilization allows data to be transferred and the payment to be processed at an optimal time (e.g., over night when payment network load is lower, etc.). Additionally, by waiting to process the card until a response to the financing offer is received, the payment processing system 208 may avoid incurring a payment processing charge on the transaction, if the financing offer is accepted. Conversely, by waiting to process the payment card until after acceptance is received, the payment processing system is open to risk that the payment card will be declined when charged, so the payment processing system 208 may determine whether the customer is eligible for financing and/or is unlikely to have the payment card declined as is described in reference to FIG. 4. If the payment processing system 208 waits to process the payment associated with the transaction and the customer accepts the offer, then the financing funds are sent to a merchant account associated with the merchant, and repayment can be collected from the customer, for example, in one or more transactions via a less expensive funds transfer method, such as ACH.

In some implementations, in order to avoid the risk that a payment card will be declined (e.g., due to insufficient funds), the payment processing module 526 may place an authorization hold on the payment card and then release the hold after receiving an acceptance of the financing offer.

In instances where the payment card is a debit card, the payment processing module 526 may charge the transaction amount to the debit account associated with the debit card, send the funds to the merchant, and then, if the financing offer is accepted, deposit the financed amount into the debit account. For example, if a customer enters into a transaction for $100 using a debit card, the payment processing module 526 charges $100 to the debit account and sends the funds to the merchant, and then, after acceptance of the financing offer by the customer, the payment processing module 526 transfers the financed $100 to the debit account.

In instances where the payment card is a credit card, the payment processing module 526 may charge the transaction amount to the credit account associated with the credit card. If the financing offer is accepted, the credit account may be refunded or the financed amount may be deposited into a bank account designated by the customer. For example, if a customer enters into a transaction for $100 using a credit card, the payment processing module 526 may charge $100 to the credit account and send the funds to the merchant, and then, after acceptance of the financing offer by the customer, the payment processing module 526 may reimburse $100 to the credit account or deposit $100 in the customer's bank account.

FIG. 3 is a block diagram of an example process 300 for enabling POS transaction financing via an interactive digital receipt according to one implementation. The processes described in FIG. 3 are illustrated as a collection of blocks in a logical flow diagram, which represents a sequence of operations, some or all of which can be implemented in hardware, software, or a combination thereof. The order in which the blocks are described should not be construed as a limitation. Any number of the described blocks can be combined in any order and/or performed in parallel to implement the processes, and not all of the blocks need be executed. For ease of description, the processes are described with reference to the environments, architectures and systems described in the examples herein, although the processes may be implemented in a wide variety of other environments, architectures and systems.

At 302, the payment processing system 208 receives input indicating a transaction at a mobile POS terminal. The input may include any signal received from a POS terminal that identifies the customer and indicates to the payment processing system 208 that the customer wishes to make payment to the merchant. For example, the input may be received by a register application running on a merchant device. The register application receives payment card information and sends the payment card information to a payment processing system 208 for processing.

At 304, the payment processing system 208 stores payment information for the transaction. The payment information may identify a payment card associated with the customer and may be included in a digital signal along with other transaction information received by the payment processing system 208 from a merchant device 204. Along with storing the payment information for the transaction, the payment processing system 208 may determine the identity of the customer based on the payment information.

At 306, the payment processing system may determine whether to offer to finance the transaction. FIG. 4 is a block diagram of an example process 400 for determining whether to offer to finance the transaction. The blocks in FIG. 4 represent a series of computer-implemented operations, some or all of which are optional. The operations represented by the blocks in FIG. 4 are ideally performed automatically by the financing module 524 without intervention by a human user.

At 402, the financing module 524 determines the customer identity based on payment information received from the POS terminal and, at 404, the financing module determines whether the customer has a customer profile set up and whether that profile includes financing preferences. As described above, the customer profile may include identifying information including transaction information and/or a financing profile.

At 406, the financing module 524 evaluates past transactions of the customer processed through the payment processing system 208. The financing module 524 of the payment processing system 208 is ideally suited to evaluate whether to offer financing to the customer because the financing module 524 has access to both merchant account information 520 and customer profile information 522. In some implementations, the financing module 524 evaluates the customer based on transaction information of one or more transactions, which may include the current transaction. In some instances, the customer is evaluated based on merchant attributes. The payment processing system 208 may have knowledge about the merchant stored in merchant account information 520 that indicates the type of business, typical transaction amounts, frequency with which payment cards are declined at the merchant, geographic location, etc. For example, if a particular merchant regularly sells $2000 paintings and the payment cards of the merchant's customers are almost never declined, then that merchant's customers may be estimated to be more credit worthy by the financing module 524 and therefore more likely to be offered financing.

In some implementations, the financing module 524 may evaluate whether to offer financing to the customer based on transaction amounts, spending patterns, transaction attributes, administrative factors, payment card types, etc. For example, the financing module 524 may determine that a customer who has just spent $2000 in the transaction using a debit card rather than a credit card is confident that he has $2000 to spend and is therefore a better credit risk and more likely to receive the financing offer than if he had used a credit card.

In some implementations, the financing module 524 may evaluate whether to offer financing to the customer based on past financing offers stored in the customer profile information 522. For example, the history of financing offers may indicate the customer's payment reliability, ability to repay, likelihood to accept the offer, and so forth.

In some implementations, the financing module 524 may determine to offer financing even to a customer whose payment card was declined in the transaction. The decision to offer financing to such a customer may be based on past transactions entered into by the customer. For example, a particular customer may have a pattern of over-drafting the customer's debit or credit account whenever the customer attempts to spend more than $500 at the end of the month. The payment processing system may track the pattern, prevent an overdraft by stopping the payment card from being charged (although an authorization hold may be placed on the card), and offer financing to the customer.

At 408, the financing module 524 may request credit information for the customer such as a FICO score, credit history, debt information, income, etc., which it may use to evaluate whether to offer financing to the customer. In some instances, the financing module 524 may send a conditional financing offer to the customer stating that a credit check is required prior to approving the financing.

At 410, the financing module 524 determines financing terms for the financing offer. In some implementations, the financing terms may include interest rates or fees, a maximum amount financed, and repayment terms such as a length of repayment, payment amounts, payment methods, etc. The determination of financing terms may be based on the amount of the transaction, credit worthiness (e.g., as determined in blocks 402-408), and other customer, merchant, or transaction specific characteristics. Additionally, the financing module 524 may determine ranges of the financing terms such that a customer, upon acceptance of the financing may request a modification to the financing terms, such as a particular repayment duration, which may in turn affect repayment amounts, interest rates or fees, etc.

Returning to FIG. 3, at 308, the interactive receipt module 528 generates an interactive digital receipt based on transaction information and transmits the interactive digital receipt to a customer device, as described in reference to FIG. 2. For example, the receipt may include an indication of a payment amount associated with the payment transaction and an offer to finance the payment amount including financing and/or repayment terms. As described in further detail in reference to FIGS. 1A and 1B, the receipt may have an interactive component for the financing offer that allows the customer to accept the offer to finance the payment amount. The payment processing system 208 transmits the interactive digital receipt to a customer device associated with the customer for display and interaction.

At 312, the payment processing system 208 receives an acceptance of the financing offer via the interactive digital receipt. The financing module 524 may determine whether the acceptance was received within the time period for acceptance and whether the acceptance includes any requests for modifications to the default financing terms, as described in reference to 410 in FIG. 4. At 314, the payment processing system 208 distributes the transaction funds into a bank account of the merchant.

At 316, the payment processing system 208 (e.g., via the payment processing module 524) receives repayment from the customer according to the financing terms of the financing offer. In some implementations, repayment could be automatically taken from the payment card used by the customer in the transaction, automatically taken from a bank account of the customer to which the financing funds were deposited, or paid by the customer using some other payment method. For example, repayment could be received and deposited in a bank account of the payment processing system in a series of smaller transactions from the payment card, from a bank account of the customer via ACH, or via other means contemplated by the techniques described herein.

FIG. 5 illustrates an example architecture of a payment communication system 500 for enabling transactions between merchants 536 and customers 536. In the example of FIG. 5, a customer 532 may use any of a variety of payment cards 530 when participating in a POS transaction 534 with a merchant 536. For example, a customer 532 may typically have payment cards 530 such as credit cards, debit cards, prepaid cards, and the like, that the customer 532 may use for conducting POS transaction 534. In some implementations, the payment cards 530 may include one or more magnetic strips for providing payment card and customer information when swiped in a card reader 202 (e.g., as discussed in reference to FIG. 7). In other implementations, other types of payment cards may be used, for example smart cards having a built in integrated circuit including a memory chip, a radio frequency identification tag, and the like. In some implementations, card-less payment methods may be used. For example, a virtual payment card may be stored on a user device such as a smart phone or other device and transmittable via near field communication or other suitable means.

The payment communication system 500 in the example of FIG. 5 illustrates a merchant device 204 associated with the merchant 536 that participates in the payment service provided by the service provider of the payment processing system 208. As discussed elsewhere herein, the merchant device 204 may be a computing device (e.g., a mobile computing device or user device) able to communicate with the payment processing system 208, and with various other computing devices, through suitable communication protocols, interfaces, and networks, including the network 206. Further, the merchant device 204 may be any appropriate device operable to send and receive requests, messages, or other types of information over the network 206. Additionally, while only a single merchant device 204 is illustrated in the example of FIG. 5, in some implementations there may be additional merchant devices depending on the number of merchants participating in the payment service.

Each merchant device 204 may include an instance of a merchant application 538 executed on the merchant device. The merchant application 538 may provide POS functionality to enable the merchant 536 to accept payments at a POS location using the merchant device 204. The merchant application 538 on the merchant device 204 may send transaction information via data network 206 (e.g., the internet) to the payment processing system 208, e.g., as the transaction is being conducted at the POS location. For example, the merchant application 538 may be a register application configured to receive an input from the merchant indicating a product or service for purchase by the customer and receive payment card information from a payment card reader coupled with a mobile POS terminal to facilitate a transfer of funds from the customer to the merchant. A mobile POS terminal may include a merchant device 204, a payment card reader, and one or more other components as described herein.

In some types of businesses, the POS location may correspond to a store or other place of business of the merchant, and thus, may be a fixed location that typically does not change on a day-to-day basis. In other types of businesses, however, the POS location may change from time to time, such as in the case that the merchant 536 operates a food truck, is a street vendor, a cab driver, or has an otherwise mobile business, e.g., in the case of merchants who sell items at customers' homes, customers' places of business, and so forth.

Accordingly, the merchant 536 and the customer 532 may conduct a POS transaction 534 by which the customer 532 acquires an item or service from the merchant 536 at a POS location. The merchant application 538 on the merchant device 204 may send transaction information to the payment processing system 208, e.g., as the transaction is being conducted at the POS location. In some implementations, such as if a particular merchant device 204 is not connected to the network 206 and is therefore processing transactions offline, the transaction information may be sent in a batch at a subsequent point in time or using other suitable techniques. In some implementations, the transaction information may be sent via SMS, MMS, or a voice call.

The transaction information may include information regarding the time, place, and the amount of each respective transaction, information related to the item acquired, payment card information, as well as additional information, such as customer information. For instance, the transaction information can include data stored in the payment card, e.g., magnetic stripe or integrated circuit data (cardholder name, card number, and other card information). In addition, when completing the transaction a customer may sometimes provide a receipt e-mail address for receiving an interactive digital receipt through e-mail, a phone number for receiving a receipt via text message, a user name for receiving the receipt via an interactive receipt application, etc. Other examples of transaction information that can be captured include detailed item information, e.g., an itemized listing of the items or services being acquired, the price being paid for each item or service, descriptors of the items or services (e.g., size, flavor, color, etc.), geolocation data indicating a geographic POS location of a particular transaction, online/offline card data, data describing the merchant, e.g., a merchant identifier, a merchant category code (MCC), data describing a customer, any type of data that is received upon a customer's authentication into a social network, if any, and various other types of information.

To accept electronic payments for POS transactions, the merchant 536 typically creates a merchant account with the payment processing system 208 by providing information describing the merchant including, for example, merchant name, contact information (e.g., telephone numbers, the merchant's address, and one or more financial accounts to which funds collected from customers will be deposited). This merchant information can be securely stored by the service provider, for example, as merchant account information 520 in a secure database. Further, the merchant information may include a merchant profile created for each merchant. The merchant profile may include information about the merchant 536 and transaction information associated with transactions conducted by the merchant.

A customer may create a customer profile by creating an account with the payment processing system 208 or by merely using a payment card in a transaction processed by the payment processing system 208. After a customer profile has been created, the customer may modify the customer's profile by providing information describing the customer, for example, customer name, contact information, payment information, etc. The customer profile may be stored by the service provider, for example, as customer profile information 522 in a secure database.

The secure databases that store the merchant account information 520 and customer profile information 522 may include data storage devices (e.g., a non-transitory computer-readable medium) for storing and providing access to data. The data stored by the data storage devices may be organized and queried using various criteria including stored data types and may include data tables, databases, or other organized collections of data. The components of the payment processing system 208 may be communicatively coupled to the data storage device and may access (e.g., read, write, modify, delete, etc.) the data stored therein.

The merchant account information 520 and/or customer profile information 522 stored in the data storage devices may include financial account information (e.g., routing number for a checking account, payment card numbers, balance, etc.), financial history, financing terms for past financing, financing terms for current financing with the payment processing system 208, geographical location information, customer information, merchant information, etc. Financial history may include financial transaction data, account balance data, repayment history, financing offer response history, merchant attribute data, customer attribute data, and other types of data, which are contemplated herein. For example, financial transaction data may include a history (frequency, amount, regularity, location, etc.) of financial transactions processed through the payment processing system 208, etc. Merchant attribute data may include the type of merchant (taxi service, food cart, retail store) associated with transactions, whether the merchant has a brick-and-mortar store, etc.

The payment processing system 208 enables a service provider to provide a payment service in which merchants 536 are able to conduct POS transactions 534 with a plurality of customers 536, such as for selling services and/or products to the customers 536. The payment processing system 208 may include one or more servers that are configured to process secure electronic financial transactions, e.g., payment during a POS transaction 534, by communicating with the merchant device 204, card payment networks 214, and bank or other financial institution payment systems 212. The payment processing system 208 includes a payment processing module 526 that receives transaction information for processing payments made through the merchant application 538. For example, the payment processing module 526 may receive transaction information, such as an amount of the transaction, and may verify that a particular payment card 530 can be used to pay for the transaction, such as by contacting a card clearinghouse of a card payment network 214. Furthermore, in some examples, the payment processing module 526 may redirect payment information for transactions to be made using payment cards 530 to a bank, or other financial institution, payment system 212. In other implementations, the merchant device 204 may communicate directly with an appropriate card payment network 214 or bank payment system 212 for approving or denying a transaction using a particular payment card 530 for a POS transaction 534. Additional details of payment processing are discussed below.

The payment processing system 208 includes a financing module 524 for determining whether to offer financing to a customer for a transaction and what the financing terms of the financing offer should be. The financing module 524 is configured to evaluate factors associated with customers, as described elsewhere herein, to determine whether any of those customers qualify for financing. The factors for each customer may vary based on the different types of financial transactions performed by that customer and the various attributes of the customer. Thus, the financing module 524 is able to generate custom offers for each customer, in some implementations. Offers for each customer can be determined automatically without customers necessarily requesting such offers.

The financing module 524 can also determine the amount of the financing, a fee for the financing, the rate of repayment, and other terms using similar techniques. For example, the financing module 524 can apply normal regression analysis on the customer's previous financial transactions conducted through the payment processing module 526, another financial institution, another payment processing system, etc. to make such determinations. In some implementations, the fee for the financing is based on a specified percentage, e.g., 14 percent, of the funds. In some implementations, the rate of repayment is a specified percentage, e.g., 10 percent. In some implementations, the rate is determined based on targeting a 10-month repayment model.

The interactive receipt module 528 aggregates transaction information and financing offer information to generate an interactive digital receipt, send the interactive digital receipt to the customer device 210, and receive a response from the customer device 210. The interactive receipt module may communicate with the financing module 524, payment processing module 526, merchant account information 520, and customer profile information 522 to generate and send interactive digital receipts.

The customer device 210 may include any user computer device with which the customer 532 interacts to receive information, such as an interactive digital receipt. The customer device 210 may include a memory, processor, communication interface, and other components as described in reference to the merchant device 204 in FIG. 7. For example, the customer device may include a personal computer, tablet, mobile phone, smart phone, smart watch or other wearable device, etc.

As introduced above, the payment processing system 208 may be configured to communicate with one or more systems of a card payment network 214 (e.g., MasterCard®, VISAR, or the like) over the network 206 to conduct financial transactions electronically. The payment processing system 208 may also communicate with one or more bank payment systems 212 of one or more banks over the network 206. For example, the payment processing system 208 may communicate with an acquiring bank, a payment card issuing bank, and/or a bank maintaining customer accounts for electronic payments.

A payment card acquiring bank may be a registered member of a card association (e.g., Visa®, MasterCard®, or the like), and may be part of a card payment network 214. A payment card issuing bank may issue payment cards 530 to customers 536, and may pay acquiring banks for purchases made by cardholders to which the issuing bank has issued a payment card 530. Accordingly, in some implementations, the systems of an acquiring bank may be included in the card payment network 214 and may communicate with systems of a payment card issuing bank to obtain payment. Further, in some implementations, bank payment systems 212 may include systems associated with debit card issuing institutions, in which case, the systems of the debit card issuing institution may receive communications regarding a transaction in which the customer uses a debit card instead of a credit card. Additionally, there may be systems of other financial institutions involved in some types of transactions or in alternative system architectures, and thus, the foregoing are merely several examples.

The network 206 can be a conventional type, wired or wireless, and may have numerous different configurations including a star configuration, token ring configuration, or other configurations. Furthermore, the network 206 may include a local area network (LAN), a wide area network (WAN) (e.g., the internet), and/or other interconnected data paths across which multiple devices may communicate. In some implementations, the network 206 may be a peer-to-peer network. The network 206 may also be coupled with or include portions of a telecommunications network for sending data using a variety of different communication protocols. In some implementations, the network 206 may include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, e-mail, etc. Although the example of FIG. 5 illustrates one network 206 coupled to the merchant device, customer device, payment processing system, card payment network, and bank, in practice one or more networks 206 can connect these entities.

Figure 6:
FIG. 6 illustrates an example block diagram of components of a payment processing system.

FIG. 6 is a block diagram 600 illustrating select components of an example payment processing system 208 according to some implementations. The payment processing system 208 may be any suitable type of computing device capable of sending communications and performing the functions according to the techniques described herein and may be operated by a service provider that provides the payment processing service. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the examples herein illustrate the components and data of the payment processing system 208 as being present in a single location, these components and data may alternatively be distributed across different computing devices and different locations. Consequently, the functions may be implemented by one or more computing devices, with the various functionality described above distributed in various ways across the different computing devices, to collectively implement the payment processing system 208. Multiple payment processing systems 208 may be located together or separately, and organized, for example, as virtual servers, server banks and/or server farms. The described functionality may be provided by the servers of a single entity or enterprise, or may be provided by the servers and/or services of multiple different customers or enterprises.

In the example of FIG. 6, the payment processing system 208 includes one or more processors 602, one or more memory devices 604, one or more communication interfaces 618, and one or more input/output devices 620. These components may be similar to those described with reference to FIG. 7 and elsewhere herein.

The memory 204 may be used to store and maintain any number of functional components or modules that are executable by the processor 602. In some implementations, these functional components comprise instructions or programs that are executable by the processor 602 and that, when executed, implement operational logic for performing the actions and services attributed above to the payment processing system 208. Functional components of the payment processing system 208 stored in the memory 204 may include the financing module 524, the payment processing module 526, the interactive receipt module 528, the operating system 614, and other modules and data 616. These components may be similar to those described with reference to FIG. 5 and elsewhere herein. In addition, the memory 604 may store data used for performing the operations described herein. Thus, the memory 604 may store merchant information 520, including the merchant profiles and customer profile information 522, including customer profiles. Further, the payment processing system 208 may include many other logical, programmatic and physical components, of which those described above are merely examples that are related to the discussion herein.

Figure 7:
FIG. 7 illustrates an example block diagram of components of a merchant device.

FIG. 7 is a block diagram 700 illustrating select components of an example merchant device 204 according to some implementations. The merchant device 204 may be any suitable type of user computing device, e.g., portable, semi-portable, semi-stationary, or stationary. Some examples of the merchant device 204 may include tablet computing devices; smart phones and mobile communication devices;

laptops, netbooks and other portable computers or semi-portable computers; desktop computing devices, terminal computing devices and other semi-stationary or stationary computing devices; dedicated register devices; wearable computing devices, or other body mounted computing devices; augmented reality devices; or other computing devices capable of sending communications and performing the functions according to the techniques described herein.

In the example of FIG. 7, the merchant device 204 includes at least one processor 702, a memory 704, one or more communication interfaces 706, and one or more input/output (I/O) devices 708. Each processor 702 may itself comprise one or more processors or processing cores. For example, the processor 702 can be implemented as one or more microprocessors, microcomputers, microcontrollers, digital signal processors, central processing units, state machines, logic circuitries, and/or any devices that manipulate signals based on operational instructions. In some implementations, the processor 702 may be one or more hardware processors and/or logic circuits of any suitable type specifically programmed or configured to execute the algorithms and processes described herein by performing various input/output, logical, and/or mathematical operations. The processor 702 can be configured to fetch and execute computer-readable processor-executable instructions stored in the memory 704.

Depending on the configuration of the merchant device 204, the memory 704 may be an example of tangible non-transitory computer storage media (e.g., computer-readable media) and may include volatile and nonvolatile memory and/or removable and non-removable media implemented in any type of technology for storage of information such as computer-readable processor-executable instructions, data structures, program modules or other data. The computer-readable media may include, but is not limited to, RAM, ROM, EEPROM, flash memory, solid-state storage, magnetic disk storage, optical storage, and/or other computer-readable media technology. Further, in some cases, the merchant device 204 may access external storage, such as RAID storage systems, storage arrays, network attached storage, storage area networks, cloud storage, or any other medium that can be used to store information and that can be accessed by the processor 702 directly or through another computing device or network. Accordingly, the memory 704 may be computer storage media able to store instructions, modules or components that may be executed by the processor 702.

The memory 704 may be used to store and maintain any number of functional components or modules that are executable by the processor 702. In some implementations, these functional components comprise instructions or programs that are executable by the processor 702 and that, when executed, implement operational logic for performing the actions and services attributed above to the merchant device 204. Functional components of the merchant device 204 stored in the memory 704 may include the merchant application 538. In this example, the merchant application 538 includes a transaction module 710, a dashboard module 712, and a security module 726, although the merchant application 538 may also contain modules or portions of modules assigned herein to the payment processing system 208. The transaction module 710, for example, presents an interface, such as a payment interface to enable the merchant to conduct transactions, receive payments, and so forth, as well as for communicating with the payment processing system 208 for processing payments and sending transaction information. The dashboard module 712 enables the merchant to manage the merchant's account, the merchant profile, merchant preferences, view saved or new pricing information, communicate with the payment processing system 208 regarding cash advances, offers of incentives, invitations, and the like. The security module 726 may, as described herein, enable the merchant application 538 to encrypt and decrypt transaction information communicated between the merchant device 204 and other system components. Additional functional components may include an operating system 714 for controlling and managing various functions of the merchant device 204 and for enabling basic user interactions with the merchant device 204.

In addition, the memory 704 may also store data, data structures and the like, that are used by the functional components. For example, data stored by the memory 704 may include item information 716 that includes information about the items offered by the merchant, which may include a list of items currently available from the merchant, images of the items, descriptions of the items, prices of the items, and so forth. For instance, when the merchant 536 is setting up the merchant application 538 to accept payments for particular items offered by the merchant 536, the merchant may enter the item information 716 for the particular items. Depending on the type of the merchant device 204, the memory 704 may also optionally include other functional components and data, such as other modules and data 718, which may include programs, drivers, etc., and the data used or generated by the functional components. Further, the merchant device 204 may include many other logical, programmatic and physical components, of which those described are merely examples that are related to the discussion herein.

The communication interface(s) 706 may include one or more interfaces and hardware components for enabling communication with various other devices, such as over the network(s) 206 or directly. For example, communication interface(s) 706 may enable communication through one or more of the internet, cable networks, wireless networks (e.g., Wi-Fi) and wired networks, as well as close-range communications such as Bluetooth®, Bluetooth® low energy, and the like.

In another implementation, the communication interface(s) 706 may include a cellular communications transceiver for sending and receiving data over a cellular communications network such as via voice call, short messaging service (SMS), multimedia messaging service (MMS), hypertext transfer protocol (HTTP), direct data connection, WAP, e-mail or another suitable type of electronic communication. The communication interface(s) 706 also provides other conventional connections to the network 206 for distribution of files and/or media objects using standard network protocols such as TCP/IP, HTTP, HTTPS and SMTP as will be understood.

The merchant device 204 may further include a display 720, which may employ any suitable display technology. For example, the display 720 may be a liquid crystal display, a plasma display, a light emitting diode display, an OLED (organic light-emitting diode) display, an electronic paper display, or any other suitable type of display able to present digital content thereon. In some implementations, the display 720 may have a touch sensor associated with the display 720 to provide a touchscreen display configured to receive touch inputs for enabling interaction with a graphical user interface presented on the display 720. Accordingly, implementations described herein are not limited to any particular display technology. Alternatively, in some implementations, the merchant device 204 may not include the display 720, and information may be presented by other means, such as aurally.

The merchant device 204 may further include one or more I/O devices 708. The I/O devices 708 may include speakers, a microphone, a camera, and various user controls (e.g., buttons, a joystick, a keyboard, a keypad, etc.), a haptic output device, and so forth.

In addition, the merchant device 204 may include or may be connectable to a payment card reader 202. In some implementations, the payment card reader 202 may plug in to a port in the merchant device, such as a microphone/ headphone port, a data port, or other suitable port. The payment card reader 202 may include a card interface for reading a magnetic stripe or an integrated circuit of a payment card 530, and further may include encryption technology for encrypting the information read from the payment card 530. Alternatively, numerous other types of payment card readers 202 may be employed with the merchant devices 204 herein, depending on the type and configuration of the merchant device 204.

As used here, the term "payment card" or "payment instrument" refers to a payment mechanism which includes a debit card, a conventional credit card, "smartcards" that have embedded integrated circuit chips (e.g., EUROPAY-MASTERCARD-VISA (EMV) cards), or any wallet-size card which functions as a combination of any of these payment mechanisms. In some implementations, a payment card or payment instrument may also include a virtual payment card stored on a user device such as a smart phone, smart watch, or other device and transmittable, for example, via near field communication or other suitable means.

Other components included in the merchant device 204 may include various types of sensors (not shown), which may include a GPS device, an accelerometer, gyroscope, compass, proximity sensor, and the like. Additionally, the merchant device 204 may include various other components that are not shown, examples of which include removable storage, a power source, such as a battery and power control unit, and so forth.

A payment communication system using a payment card reader has been described. In the above description, for purposes of explanation, numerous specific details are set forth in order to provide a thorough understanding of the techniques introduced herein. It will be apparent, however, to one skilled in the art that the techniques can be practiced without these specific details. In other instances, structures and devices are shown in block diagram form in order to avoid obscuring the description and for ease of understanding. For example, the techniques are described in one implementation above primarily with reference to software and particular hardware. However, the techniques may be implemented using any type of computing system that can receive data and commands, and present information as part of any peripheral device providing services.

It should be understood that the implementations and examples are provided by way of illustration and should not be construed as limiting. Moreover, it should also be understood that the engines and modules as well as their functions and operations may be further delineated, combined, rearranged, and/or adjusted without departing from the scope of the subject matter described herein.

Reference in the specification to "one implementation" or "an implementation" means that a particular feature, structure, or characteristic described in connection with the implementation is included in at least one implementation of the description. The appearances of the phrase "in one implementation" in various places in the specification are not necessarily all referring to the same implementation.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Furthermore, the techniques introduced herein can be embodied in the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Finally, the algorithms presented herein are not inherently related to any particular computer or other apparatus. Various general-purpose systems may be used with programs in accordance with the teachings herein, or it may prove convenient to construct more specialized apparatus to perform the required method steps. In addition, the techniques introduced herein are not described with reference to any particular programming language. It will be appreciated that a variety of programming languages may be used to implement the techniques as described herein.

The foregoing description of the implementations has been presented for the purposes of illustration and description. It is not intended to be exhaustive or to limit the techniques to the precise form disclosed. Many modifications and variations are possible in light of the above teaching. It is not intended that the scope of the implementations be limited by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats. Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, or similar components known to those of ordinary skill in the art of computer programming. Additionally, the techniques are in no way limited to implementation in any specific programming language, or for any specific operating system or environment. Accordingly, the detailed description is intended to be illustrative, but not limiting, of the scope of the claims, which are set forth below.

What is claimed:

1. A system comprising:
one or more processors configured by executable instructions that cause the one or more processors to perform operations including:
receiving an indication of a payment for a transaction between a first user and a second user, wherein the indication is received from a second user device that is associated with the second user and that is in communication with a card reader, wherein the payment is initiated using card information that is read using the card reader from at least one of a physical card of the first user or a virtual card of the first user, and wherein the physical card and the virtual card are associated with an account of the first user;
causing a notification representative of the transaction to be presented via a user interface of a first user device of the first user in response to receipt of the indication of the payment, wherein the notification includes transaction details associated with at least the transaction and an interactive component to enable the first user to finance an amount for at least a portion of the payment in lieu of using funds from the account of the first user;
receiving an indication of an interaction with the interactive component;
paying the second user using funds associated with the amount financed; and
initiating a series of payments at least from the account of the first user, wherein upon completion of the series of payments, at least the amount financed is repaid.

2. The system of claim 1,
wherein the second user device includes an application that configures the second user device to receive the card information.

3. The system of claim 2, wherein the card reader is coupled to the second user device.

4. The system of claim 2, wherein the card information is communicated directly between the physical card and the card reader.

5. The system of claim 2, wherein the card information of the virtual card is communicated directly between the first user device and the card reader.

6. The system of claim 1, the operations further comprising:
determining a time period during which the interactive component is interactive to enable the first user to finance the amount, wherein, following expiration of the time period, the interactive component ceases being interactive to enable the first user to finance the amount.

7. The system of claim 6, wherein the time period corresponds, at least in part, to an amount of time to wait before charging the account of the first user for the transaction using the card information.

8. The system of claim 1, wherein causing the notification to be presented via the user interface further comprises:
providing a link to a location on a network, the link selectable for presenting, on the first user device, the notification via a web page that includes the user interface.

9. A method comprising:
receiving, by one or more processors, an indication of a payment for a transaction between a first user and a second user, wherein the indication is received from a second user device that is associated with the second user and that is in communication with a card reader, wherein the payment is initiated using card information that is read using the card reader from at least one of a physical card of the first user or a virtual card of the first user, and wherein the physical card and the virtual card are associated with an account of the first user;
causing a notification representative of the transaction to be presented via a user interface of a first user device of the first user in response to receipt of the indication of the payment, wherein the notification includes transaction details associated with at least the transaction and an interactive component to enable the first user to finance an amount for at least a portion of the payment in lieu of using funds from the account of the first user;
receiving an indication of an interaction with the interactive component;
paying the second user using funds associated with the amount financed; and
initiating a series of payments at least from the account of the first user, wherein upon completion of the series of payments, at least the amount financed is repaid.

10. The method of claim 9,
wherein the second user device includes an application that configures the second user device to receive the card information.

11. The method of claim 10, wherein the card reader is coupled to the second user device.

12. The method of claim 10, wherein the card information is communicated directly between the physical card and the card reader.

13. The method of claim 10, wherein the card information of the virtual card is communicated directly between the first user device and the card reader.

14. The method of claim 9, further comprising:

determining a time period during which the interactive component is interactive to enable the first user to finance the amount, wherein, following expiration of the time period, the interactive component ceases being interactive to enable the first user to finance the amount.

15. The method of claim 14, wherein the time period corresponds, at least in part, to an amount of time to wait before charging the account of the first user for the transaction using the card information.

16. The method of claim 9, wherein causing the notification to be presented via the user interface further comprises providing a link to a location on a network, the link selectable for presenting, on the first user device, the notification via a web page that includes the user interface.

17. A non-transitory computer-readable medium storing instructions executable by one or more processors to configure the one or more processors to perform operations comprising:

receiving an indication of a payment for a transaction between a first user and a second user, wherein the indication is received from a second user device that is associated with the second user and that is in communication with a card reader, wherein the payment is initiated using card information that is read using the card reader from at least one of a physical card of the first user or a virtual card of the first user, and wherein the physical card and the virtual card are associated with an account of the first user;

causing a notification representative of the transaction to be presented via a user interface of a first user device of the first user in response to receipt of the indication of the payment, wherein the notification includes transaction details associated with at least the transaction and an interactive component to enable the first user to finance an amount for at least a portion of the payment in lieu of using funds from the account of the first user;

receiving an indication of an interaction with the interactive component;

paying the second user using funds associated with the amount financed; and initiating a series of payments at least from the account of the first user, wherein upon completion of the series of payments, at least the amount financed is repaid.

18. The non-transitory computer-readable medium of claim 17, wherein the second user device includes an application that configures the second user device to receive the card information.

19. The non-transitory computer-readable medium of claim 17, the operations further comprising:

determining a time period during which the interactive component is interactive to enable the first user to finance the amount, wherein, following expiration of the time period, the interactive component ceases being interactive to enable the first user to finance the amount.

20. The non-transitory computer-readable medium of claim 19, wherein the time period corresponds, at least in part, to an amount of time to wait before charging the account of the first user for the transaction using the card information.

\* \* \* \* \*